United States Patent
Shang

(10) Patent No.: US 10,000,955 B2
(45) Date of Patent: Jun. 19, 2018

(54) BIAXIAL HINGE AND TERMINAL DEVICE USING THE SAME

(71) Applicant: KEM HONGKONG LIMITED, Tsimshatsui Kowloon (HK)

(72) Inventor: Qilong Shang, Beijing (CN)

(73) Assignee: Kem HongKong Limited, Tsimshatsui Kowloon (HK)

( * ) Notice: Subject to any disclaimer, the term of this patent is extended or adjusted under 35 U.S.C. 154(b) by 0 days. days.

(21) Appl. No.: 15/463,587

(22) Filed: Mar. 20, 2017

(65) Prior Publication Data

US 2017/0275935 A1    Sep. 28, 2017

(30) Foreign Application Priority Data

Mar. 25, 2016  (CN) .......................... 2016 1 0186631

(51) Int. Cl.
| | |
|---|---|
| *E05D 3/12* | (2006.01) |
| *G06F 1/16* | (2006.01) |
| *E05D 3/06* | (2006.01) |
| *F16C 11/04* | (2006.01) |
| *F16C 11/10* | (2006.01) |

(52) U.S. Cl.
CPC ............... *E05D 3/122* (2013.01); *E05D 3/06* (2013.01); *E05D 3/12* (2013.01); *F16C 11/045* (2013.01); *F16C 11/103* (2013.01); *G06F 1/1681* (2013.01); *E05Y 2900/606* (2013.01); *Y10T 16/541* (2015.01)

(58) Field of Classification Search
CPC .. E05D 3/122; E05D 3/06; E05D 3/12; Y10T 16/541
See application file for complete search history.

(56) References Cited

U.S. PATENT DOCUMENTS

| | | | | |
|---|---|---|---|---|
| 9,127,490 B2 * | 9/2015 | Chen | ....................... | E05D 3/122 |
| 9,309,705 B2 * | 4/2016 | Hsu | ....................... | E05D 3/122 |
| 9,310,849 B2 * | 4/2016 | Hsu | ....................... | E05D 3/122 |
| 9,388,614 B2 * | 7/2016 | Hsu | ....................... | E05D 3/12 |
| 9,464,471 B1 * | 10/2016 | Chen | ..................... | G06F 1/1681 |
| 9,524,000 B2 * | 12/2016 | Hsu | ....................... | G06F 1/1681 |
| 9,606,578 B2 * | 3/2017 | Yuan | .................... | G06F 1/1616 |
| 9,611,680 B2 * | 4/2017 | Xu | .......................... | E05D 3/122 |
| 9,696,760 B1 * | 7/2017 | Zhang | .................. | G06F 1/1652 |

(Continued)

FOREIGN PATENT DOCUMENTS

JP         2012237392 A     12/2012

*Primary Examiner* — Jeffrey O'Brien
(74) *Attorney, Agent, or Firm* — Notaro, Michalos & Zaccaria P.C.

(57) ABSTRACT

Biaxial hinge compatible with thinner terminal device capable of avoiding any hindrance to the use of various plugs, the biaxial hinge having an attaching part attached to a first casing of the terminal device, wherein the attaching part has an attaching plate section and a bearing section, a first hinge shaft, a second hinge shaft, wherein the second hinge shaft is in parallel to the first hinge shaft and rotatable, a synchronous rotation generator for rotating the first and the second hinge shafts in a synchronized manner in a direction different from each other, a friction torque generator provided on the second hinge shaft for generating a friction torque to rotation of both hinge shafts, and a rotational force generator provided on the second hinge shaft as well.

5 Claims, 15 Drawing Sheets

(56) References Cited

U.S. PATENT DOCUMENTS

| | | | |
|---|---|---|---|
| 9,714,533 B2 * | 7/2017 | Kuramochi | E05D 3/12 |
| 9,921,613 B2 * | 3/2018 | Kuramochi | G06F 1/1681 |
| 2005/0050686 A1 * | 3/2005 | Kurokawa | G06F 1/1618 |
| | | | 16/354 |
| 2007/0270197 A1 * | 11/2007 | Hsieh | G06F 1/1616 |
| | | | 455/575.3 |
| 2015/0047152 A1 * | 2/2015 | Cheng | E05D 3/122 |
| | | | 16/354 |
| 2015/0342068 A1 * | 11/2015 | Su | G06F 1/1681 |
| | | | 16/354 |
| 2015/0362958 A1 * | 12/2015 | Shang | G06F 1/1681 |
| | | | 361/679.58 |
| 2016/0010374 A1 * | 1/2016 | Hsu | G06F 1/16 |
| | | | 74/414 |
| 2017/0020010 A1 * | 1/2017 | Xu | E05D 3/122 |
| 2017/0235337 A1 * | 8/2017 | Vic | G06F 1/1618 |
| | | | 361/679.55 |
| 2017/0351303 A1 * | 12/2017 | Kuramochi | E05D 3/06 |
| 2018/0024596 A1 * | 1/2018 | Park | G06F 1/1681 |

* cited by examiner

FIG. 9A
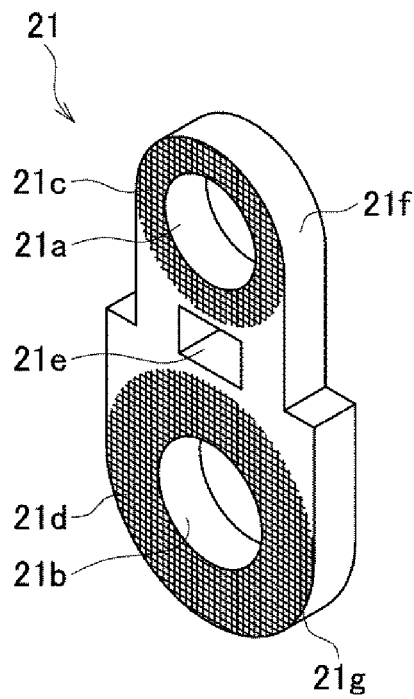
FIG. 9B
FIG. 9C
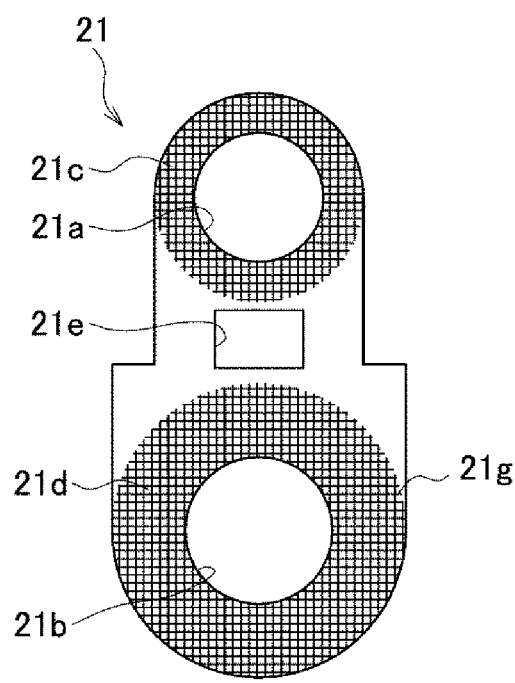 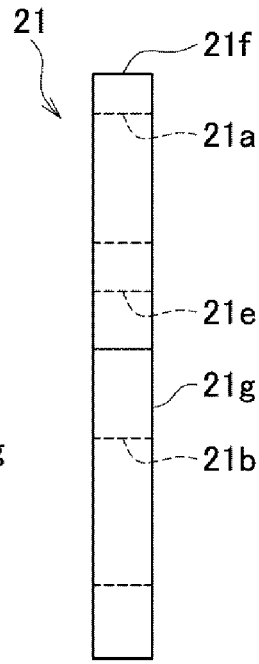

BIAXIAL HINGE AND TERMINAL DEVICE USING THE SAME

FIELD OF THE INVENTION

The invention relates to a biaxial hinge suitably used when a first casing and a second casing of a terminal device such as a notebook PC, a mobile PC and PDA open and close relative to each other. The invention further relates to a terminal device using such a biaxial hinge.

BACKGROUND ART

There are two types of biaxial hinge that is a crossover-type biaxial hinge in which the first and second hinge shafts intersect each other, and parallel biaxial hinge in which the both hinge shafts are arranged in parallel. The invention relates to the latter, a parallel biaxial hinge.

The parallel biaxial hinge has advantage in comparison to uniaxial hinge that the first casing and the second casing connected via the hinge can be opened equally on the right and on the left, as if a book in the hands were opened. Such parallel biaxial hinge is known e.g. as is described in the Patent Document 1 below.

However, the biaxial hinge according to the Patent Document 1 has a problem in that, when a first casing is opened 90 degrees relative to a second casing, a rear side surface of the first casing comes to a position to cover a rear side surface of the second casing, which may interfere with various ports such as LAN ports, USB ports, etc., as well as power connector—i.e. those components often arranged on the rear side surface of the first casing—, then the cables connected with these components are also affected. Such an interference results in hindrance to their use, unsatisfactory heat exhaust and thus a reduced product life.

Still further, the biaxial hinge according to the Patent Document 1 has a problem in that it cannot effectively satisfy the recent needs for more lightweight and thinner notebook PC.

[Patent Document 1] JP Laid-Open Patent Application No. 2012-237392

SUMMARY OF THE INVENTION

The invention is made to solve the above-mentioned problems. An object of the invention is to provide a biaxial hinge which is well compatible with a terminal device much thinner than before, causes hindrance neither to use nor to heat exhaust of various plugs, cables etc., and is manufactured at low costs.

To achieve the above-mentioned object, a biaxial hinge according to the invention is that which couples a first casing and a second casing, so that these casings are openable and closable relative to each other; the biaxial hinge is characterized in that it comprises: an attaching member comprising an attaching plate portion attached to the first casing and a bearing portion provided with a large diameter portion and a small diameter portion erected upward from the attaching plate portion; a first hinge shaft with a smaller outer diameter pivotally supported toward a top of the bearing portion of the attaching member so as to be rotatable, wherein the first hinge shaft is attached via an attaching plate; a second hinge shaft with an outer diameter larger than the first hinge shaft wherein the second hinge shaft is pivotally supported toward a bottom of the bearing portion of the attaching member in parallel to the first hinge shaft and with a shift in an axial direction; and a synchronous rotation generator provided between the first hinge shaft and the second hinge shaft, wherein the rotation of the synchronous rotation generator is synchronized with that of one of the hinge shafts, the synchronous rotation generator allowing the other of the hinge shafts to rotate in a different direction; still further, the biaxial hinge is characterized in that a subordinate friction torque generator for generating a friction torque in rotation of the first hinge shaft is provided on the first hinge shaft side, and that a main friction torque generator for generating a friction torque larger than the subordinate friction torque generator in rotation of the second hinge shaft and a rotational force generator are provided on the second hinge shaft side.

Here, the invention is characterized in that the synchronous rotation generator comprises: a first gear attached to the first hinge shaft, wherein the rotation of the first gear is restrained; a second gear attached to the first hinge shaft with an outer diameter larger than the first gear, wherein the rotation of the second gear is restrained; and an intermediate gear provided between the first gear and the second gear for transmitting the rotation of one gear to the other, which allows one gear to rotate in a direction different from the other.

Moreover, the invention is characterized in that the synchronous rotation generator comprises: a first gear attached to the first hinge shaft, wherein the rotation of the first gear is restrained; and a second gear attached to the first hinge shaft with an outer diameter larger than the first gear, wherein the rotation of the second gear being restrained, which allows the second gear to rotate in a direction different from the first gear.

Still further, the invention is characterized in that the main friction torque generator comprises: a friction plate into which the first hinge shaft and the second hinge shaft are rotatably inserted; a friction washer provided between the large-diameter portion of the bearing portion of the attaching member and the large-diameter portion of the friction plate; and an elastic member provided on the second hinge shaft for bringing the attaching member and the friction washer into press contact with the friction washer.

Still further, the invention is characterized in that the subordinate friction torque generator comprises: a friction plate into which the first hinge shaft and the second hinge shaft are rotatably inserted; a first washer arranged between one side of a small diameter portion of the friction plate and a small diameter portion of the attaching member, wherein the rotation of the first washer relative to the first hinge shaft is restrained; and a second washer disposed between the other side of a small diameter portion of the friction plate and a first fastening nut screwed onto the first hinge shaft, wherein the rotation of the first hinge shaft is restrained.

Still further, the invention is characterized in that a rotational force generator comprises: a cam plate member arrested on the friction plate, the second hinge shaft is rotatably inserted therein, and having a substantially arc-shaped cam concave portion and cam convex portion outside on one side on its one side portion; a cam follower member attached to the second hinge shaft, wherein the rotation of the cam follower member is restrained, and having a cam concave portion and a cam convex portion on one surface of the cam follower member facing the cam concave portion and the cam convex portion of the cam plate member; and an elastic member bringing the cam plate member and the cam follower member, both provided on the second hinge shaft into press contact with each other.

Still further, the invention is characterized in that the biaxial hinge according to one of the above-mentioned aspects is used for a terminal device.

As mentioned above, according to the invention, the first casing can be thinned due to the structure of the first hinge shaft attached to the second casing, as well as the first gear and washers attached to the first hinge shaft in that they respectively have an outer diameter smaller than the second hinge shaft attached to the first casing, as well as the second gear and friction washers attached to the second hinge shaft. On the other hand, necessary friction torque can be secured by providing only on the second hinge shaft the main friction torque generator, the rotational force generator and the elastic member allowing the both to function. In this manner, the invention has operation and effect to be able to use a biaxial hinge that does not hinder function of various plugs, cables etc. which are connected to various ports provided on the rear side surface of the first casing, so that these may be conventionally confronted by the rear side surface of the second casing; furthermore, the invention has operation and effect to favorably use an inexpensive and well adaptable biaxial hinge.

Still further, the invention can provide a thinner and more convenient terminal device using the above-mentioned biaxial hinge according to the invention.

BRIEF DESCRIPTION OF THE DRAWINGS

FIGS. 9A to 9C show a friction plate of a biaxial hinge according to the invention in enlarged views, FIG. 9A being its plan view, FIG. 9B—its left hand side view and FIG. 9C—its elevation view;

EMBODIMENTS

Hereinafter, reference is made based on the drawings to the embodiments in which a biaxial hinge according to the invention is applied to a notebook PC being an example of a terminal device. However, targeted terminal devices using the biaxial hinge according to the invention are not limited to a notebook PC, but the biaxial hinge is also applicable to other terminal devices such as a mobile PC, a terminal device such as PDA and others, i.e. those devices comprising a first casing and a second casing, wherein the casings are coupled to each other, such that the casings can open and close in an upward and downward direction.

Embodiment 1

Figure 1A:
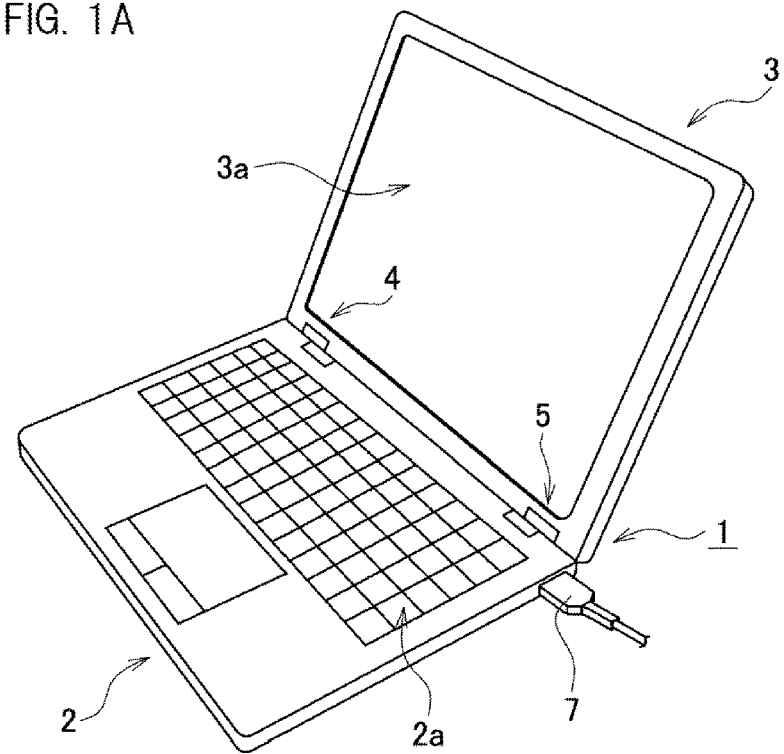
FIGS. 1A and 1B show a notebook PC being an example of a terminal device, with a biaxial hinge according to the invention being attached thereto, FIG. 1A being its perspective view as seen from front side, while a first casing and a second casing are opened, and FIG. 1B being its perspective view as seen from rear side, while a first casing and a second casing are closed.
Figure 1B:
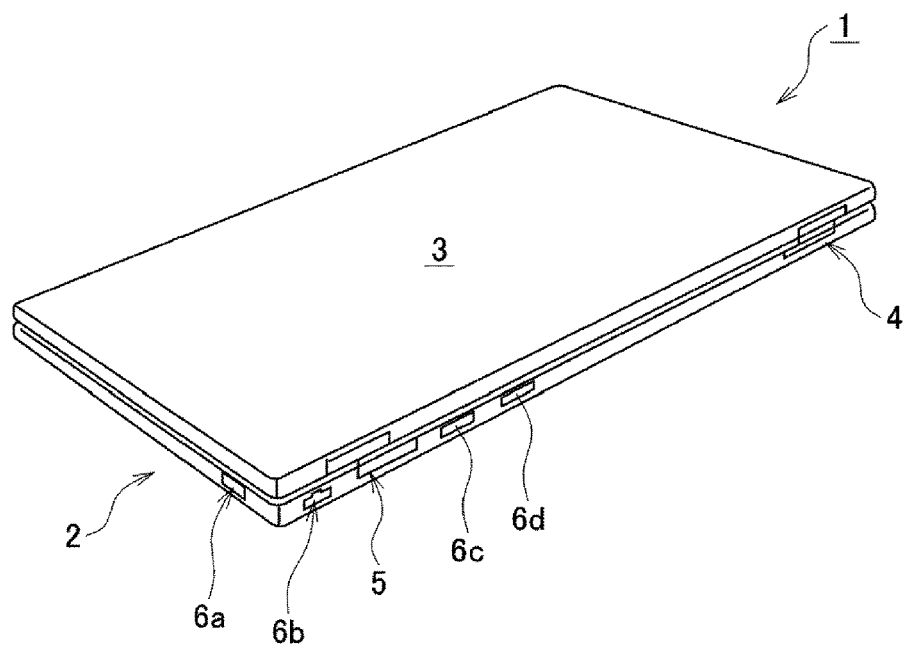
Figure 2:
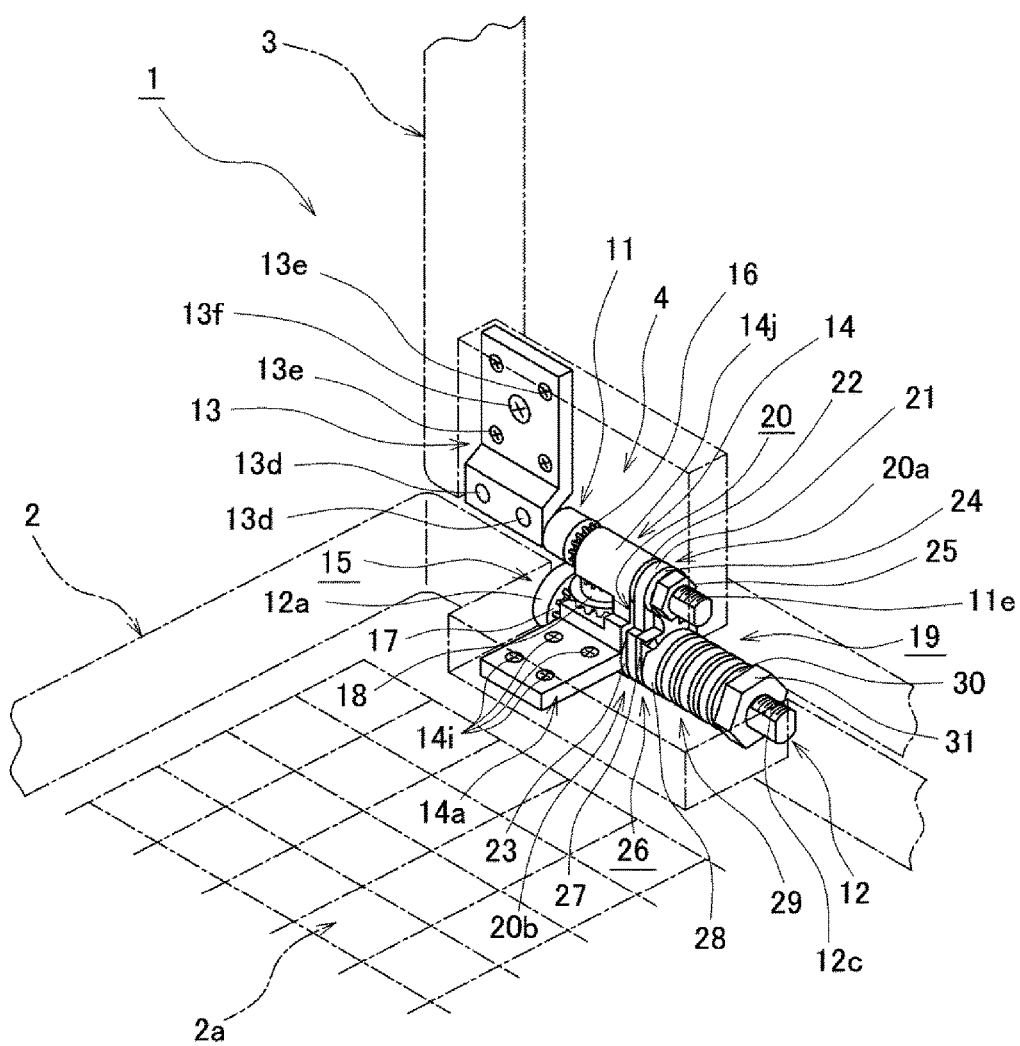
FIG. 2 is an explanatory view for illustrating a biaxial hinge according to the invention as attached to a terminal device.

FIGS. 1A and 1B show a notebook PC 1 being an example of a terminal device using a biaxial hinge according to the invention. The notebook PC 1 comprises a first casing 2 provided with a key board portion 2a and a second casing 3 provided with a display portion 3a, wherein the casings are coupled via a pair of biaxial hinges 4 and 5 to each other at spots on the right and left sides of their respective rear portions, such that the casings can open and close relative to each other. A power connector 6a for receiving a power plug 7 is provided on a right side surface of the first casing 2, while on its rear side surface, various ports such as LAN port 6b and USB ports 6c, 6d, etc., as well as heat vents are disposed.

Since both biaxial hinges 4 and 5 have an identical, reference will be exclusively made to a biaxial hinge 4 in the following, and not to other biaxial hinge 5. Of course, biaxial hinge denoted with reference numeral 5 can be manufactured in a manner different from the biaxial hinge 4, as long as the two hinges operates with no inconvenience.

Figure 3:
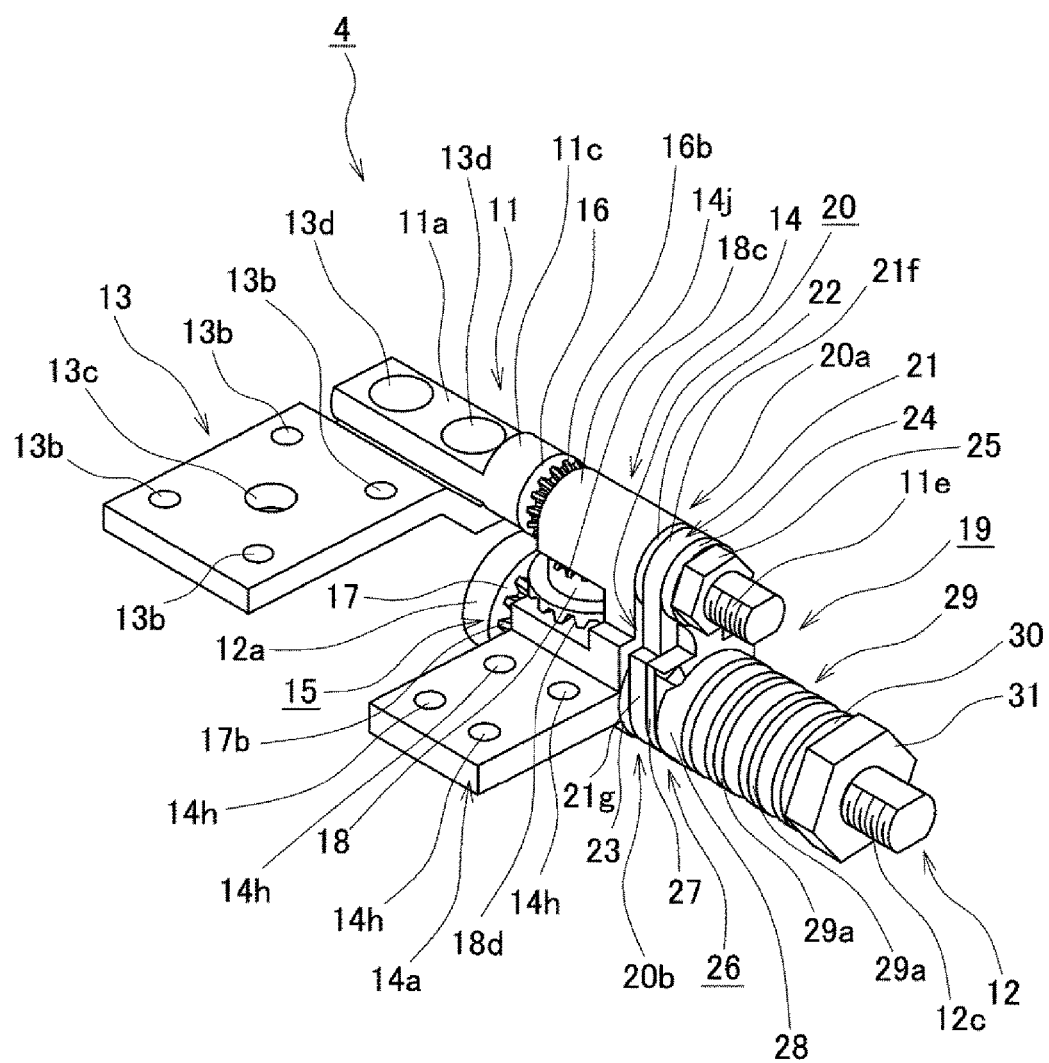
FIG. 3 shows a perspective view of a biaxial hinge according to the invention.
Figure 4A:
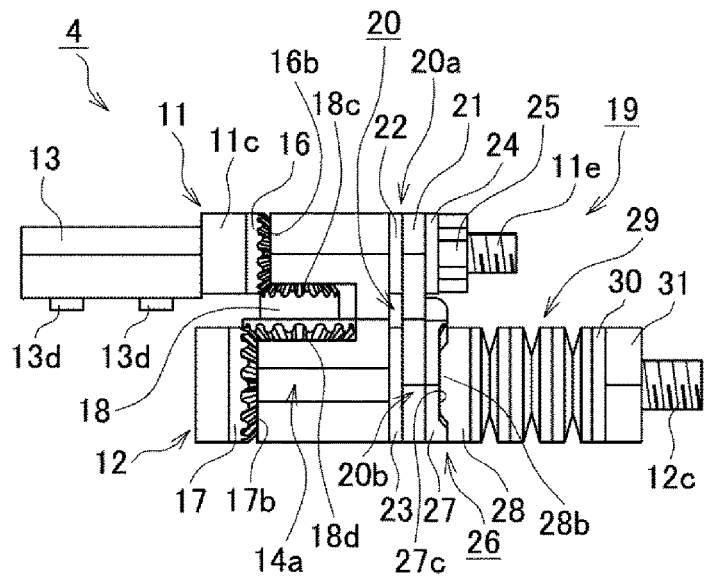
FIG. 4A to 4C show a biaxial hinge according to the invention, FIG. 4A being its elevation view, FIG. 4B—its plan view and FIG. 4C—its right hand side view.
Figure 4B:
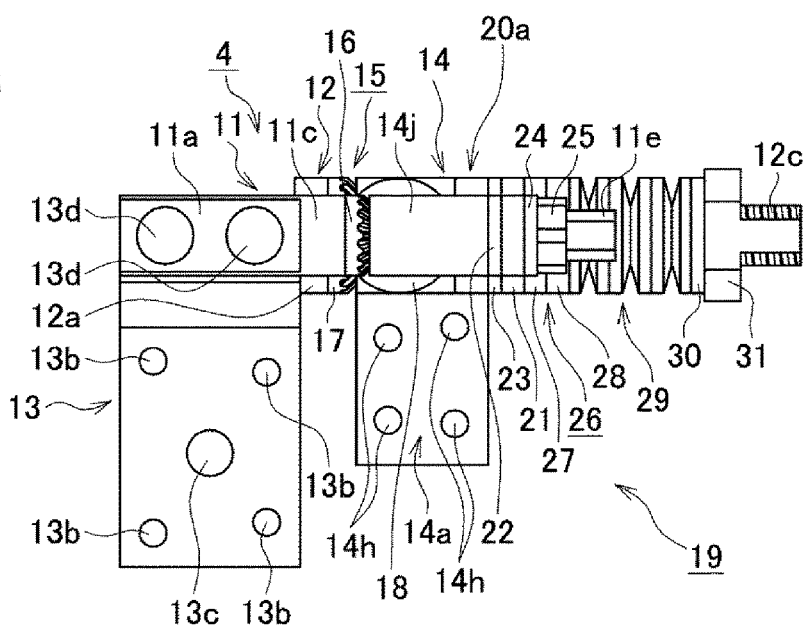
Figure 4C:
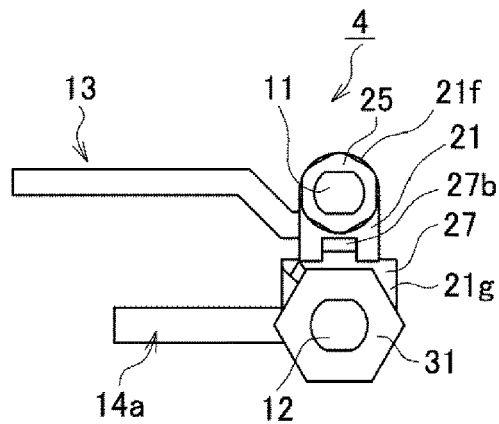
Figure 5:
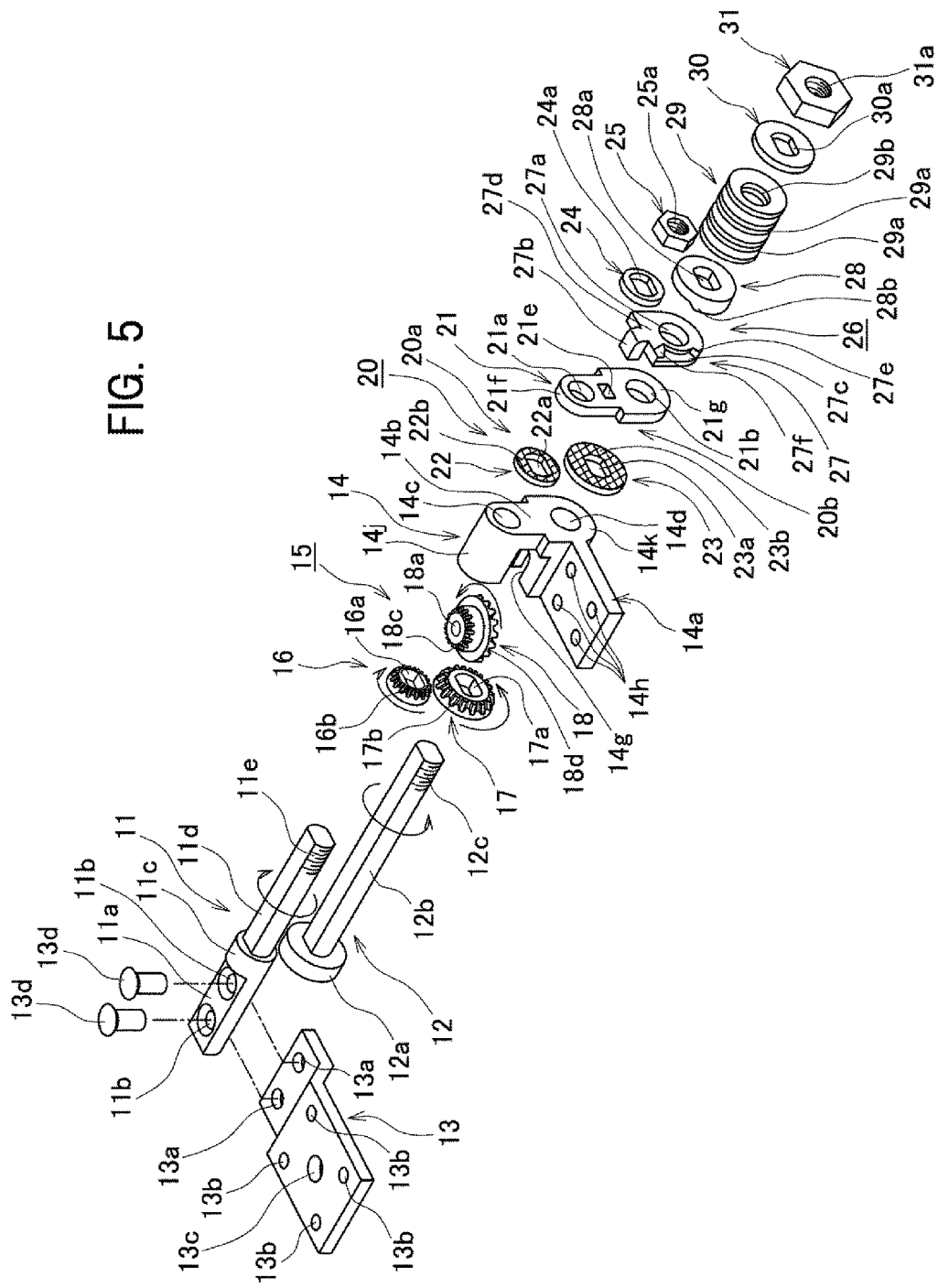
FIG. 5 shows an exploded perspective view of a biaxial hinge according to the invention.
Figure 6A:
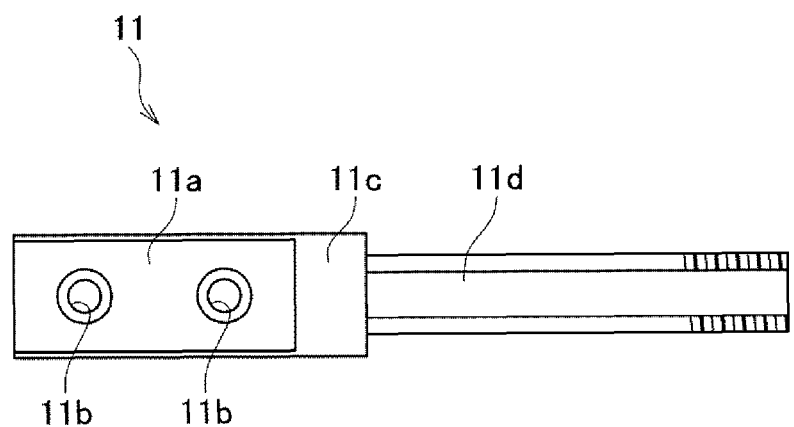
FIGS. 6A to 6C show a first hinge shaft of a biaxial hinge according to the invention, FIG. 6A being its plan view, FIG. 6B—its elevation view and FIG. 6C—its right hand side view.
Figure 6B:
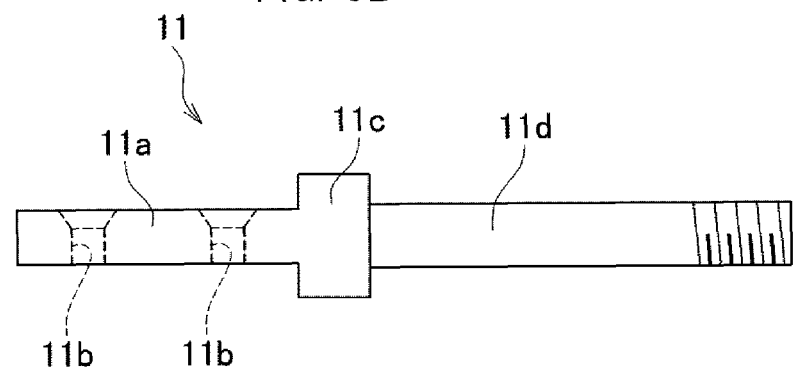
Figure 6C:
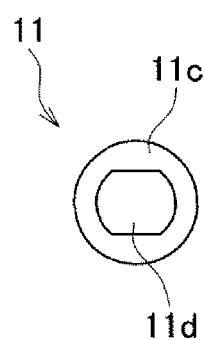
Figure 7A:
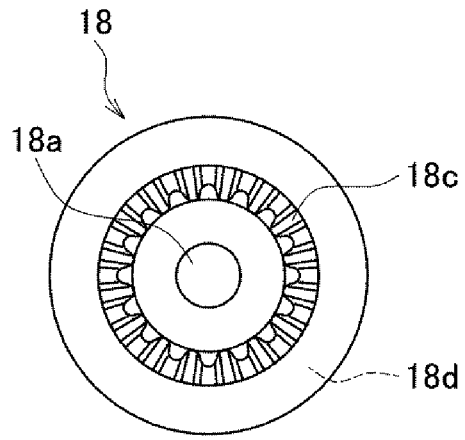
FIGS. 7A to 7C show an intermediate gear of a biaxial hinge according to the invention in enlarged views, FIG. 7A being its plan view, FIG. 7B—its elevation view and FIG. 7C—its right hand side view.
Figure 7B:
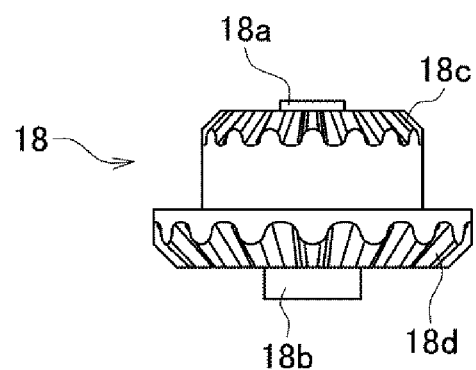
Figure 7C:
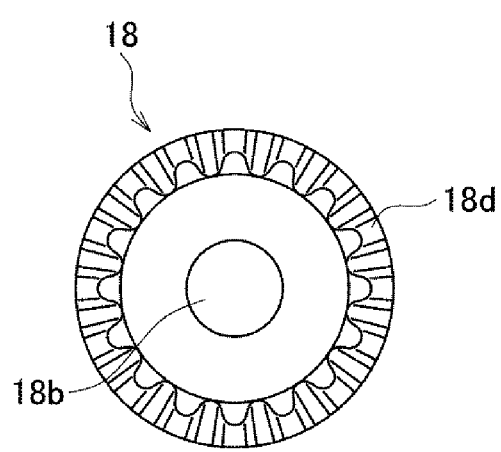
Figure 8A:
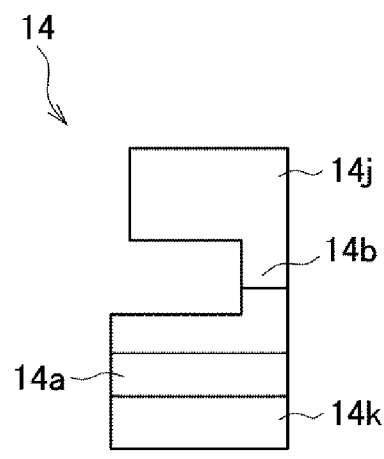
FIGS. 8A to 8D show an attaching member also functioning as a gear supporting member of a biaxial hinge according to the invention in enlarged views, FIG. 8A being its elevation view FIG. 7B—its right hand side view, FIG. 7C—its cross section in line C-C and FIG. 7D—its plan view.
Figure 8B:
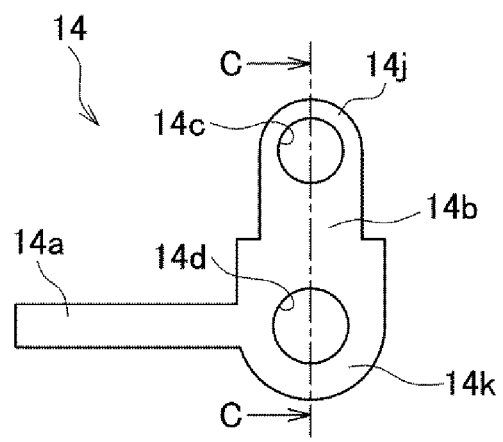
Figure 8C:
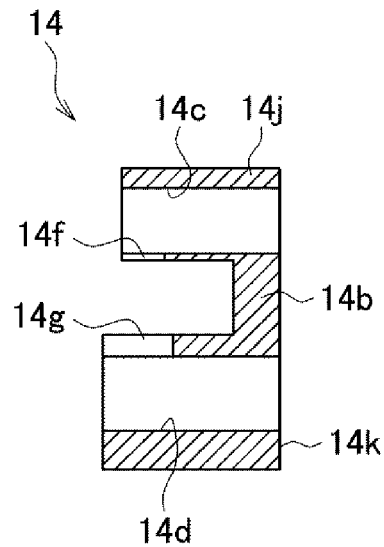
Figure 8D:
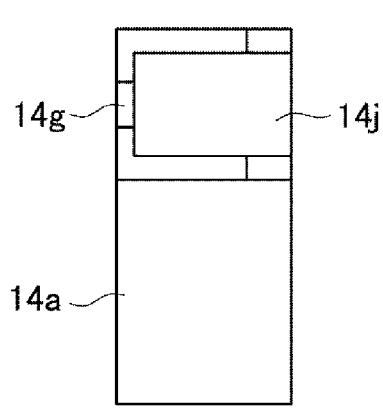
Figure 10A:
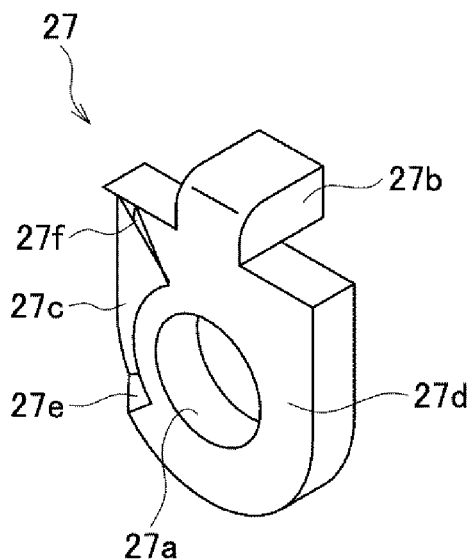
FIGS. 10A to 10C show a cam plate member of a biaxial hinge according to the invention in enlarged views, FIG. 10A being its perspective view, FIG. 10B—its elevation view and FIG. 10C—its right hand side view.
Figure 10B:
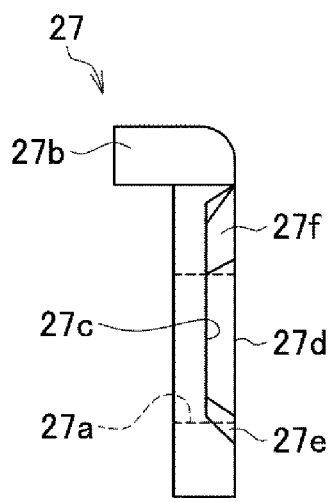
Figure 10C:
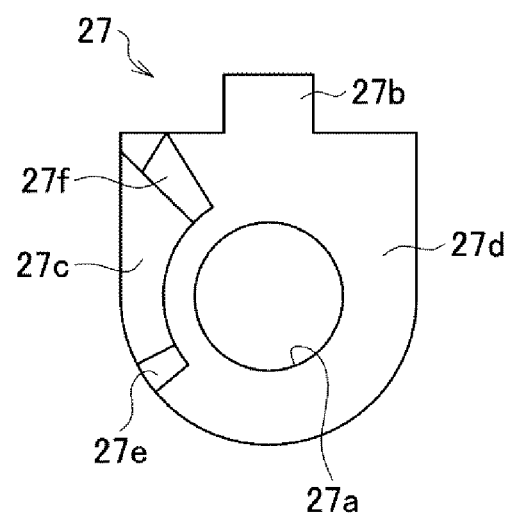
Figure 11A:
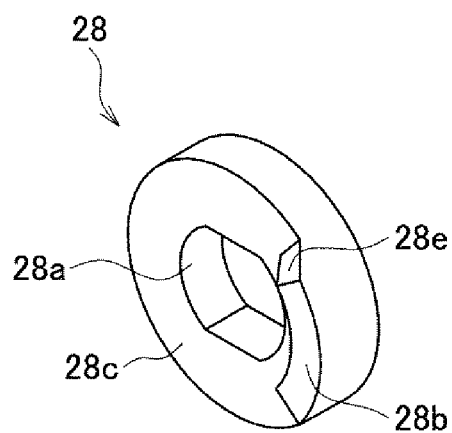
FIGS. 11A to 11C show a cam follower member of a biaxial hinge according to the invention in enlarged views, FIG. 11A being its perspective view, FIG. 11B—its left hand side view and FIG. 11C—its elevation view.
Figure 11B:
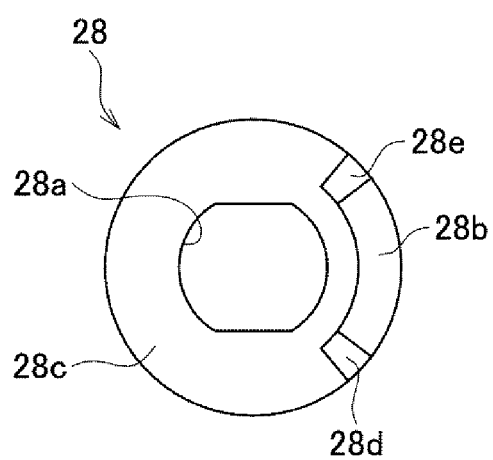
Figure 11C:
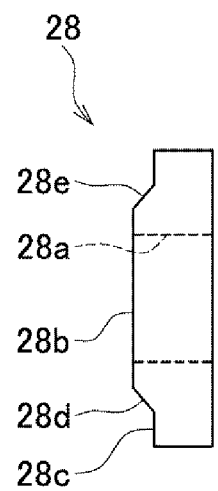

FIGS. 2 to 11C show an embodiment of a biaxial hinge 4 according to the invention. Particularly as shown in FIGS. 5, 6A and 6B, a diameter of a first hinge shaft 11 is smaller than that of a second hinge shaft as described below. The first hinge shaft 11 comprises, as seen from one end, an attaching plate portion 11a having a substantially flat cross section, wherein attaching holes 11b, 11b are provided on its surface; a flange portion 11c provided next to the attaching plate portion 11a and having a diameter smaller than a flange portion 12a provided on the second hinge shaft 12; a deformed shaft portion 11d provided next to the flange portion 11c and having a substantially elliptic cross section; and a male screw portion 11e provided close to a tip of the deformed shaft portion 11d.

As shown in FIGS. 2 to 6C, a first attaching plate 13 is attached to an attaching plate portion 11a of a first hinge shaft 11; as per mode of attaching, the former is attached to the latter by caulking respective ends of flanged attaching pins 13d, 13d, as the attaching pins pass through two attaching holes 11b, 11b of a first hinge shaft 11 and attaching holes 13a, 13a of the first attaching plate 13. And then, the second attaching plate 13 is attached to a lower surface side of a second casing 13 of a notebook PC 1 using attaching screws 13e, 13e and 13f (FIG. 2) screwed into attaching holes 13b, 13b and 13c provided on the second attaching plate 13. In the meantime, attaching screws with nuts can be used instead of the attaching pins 13d, 13d. A first gear 16 with a diameter smaller than a second gear 17 mounted on the second hinge shaft 12 as described below is mounted on the deformed shaft portion 11d of the first hinge shaft 11, as it is restrained so as to be non-rotatable relative to the deformed shaft portion 11d. Additionally, the deformed shaft portion 11d of the first hinge shaft 11 is inserted sequentially through a first bearing hole 14c of an attaching member 14, a deformed insertion hole 22a of a first washer 22, a first bearing hole 21a of a friction plate 21 and a deformed insertion hole 24a of a second washer 24, and then a first fastening nut 25 is screwed using its female screw hole 25 onto a male screw portion 11e on the tip of the deformed shaft portion.

Next, equally as shown in FIGS. 2 to 5, a reference numeral 12 denotes a second hinge shaft, which is placed in parallel to a first hinge shaft 11, as seen in upward and downward direction. A diameter of a second hinge shaft 12 is larger than that of the first hinge shaft 11; the second hinge shaft 12 comprises, as seen from one end, a flange portion 12a provided on its one end portion and having a diameter larger than a flange portion 11c provided on the first hinge shaft; a deformed shaft portion 12b provided next to the flange portion 12a and having a substantially elliptic cross section; and a male screw portion 12c provided next to the deformed shaft portion 12b.

A second gear 17 with a diameter larger than a first gear 16 is mounted on the deformed shaft portion 12b of the second hinge shaft 12, as it is restrained so as to be non-rotatable relative to the deformed shaft portion 12b. Furthermore, the attaching member 14 is rotatably mounted to the deformed shaft portion 12b. An attaching plate portion 14a is integrally provided on the attaching member 14, and attached to an upper surface side of a first casing 2 using attaching screws 14i, 14i (FIG. 2) screwed into attaching holes 14h, 14h provided on the attaching plate portion 14a.

An attaching member 14 is structured so as to arrange a first hinge shaft 11 and a second hinge shaft 12 in parallel to each other in an upward and downward direction and to thus rotatably hold them. In other words, the attaching member 14 comprises a first bearing hole 14c provided on a small diameter portion 14j of a bearing portion 14b and a second bearing hole 14d provided on a large diameter portion 14k of the same bearing portion, wherein the first bearing hole and the second bearing hole are arranged in an upward and downward direction in parallel to each other; and a deformed shaft portion 11d located on one end portion of the first hinge shaft 11 is inserted into the former, while a deformed shaft portion 12d located on the other end portion of the second hinge shaft 12 into the latter. Still further, a first hinge shaft 11 and a second hinge shaft 12 are certainly disposed in parallel, but a mounting position of the first hinge shaft on the bearing portion 14b of the attaching member 14 is displaced in an axial direction relative to that of the second hinge shaft on the same bearing portion. Due to this arrangement, the first hinge shaft 11 itself as well as components attached to it can be smaller in outer diameters. Still further, the arrangement, together with a simplified structure of a subordinate friction torque generator that does not generate a large friction torque, ensures that the second casing 3 to which the first hinge shaft 11 is attached has an effect to reduce its thickness. Still further, the attaching member 14 also functions as a gear supporting member for holding a first gear 16, a second gear 17 and an intermediate gear 18, as each one meshes with its respective adjacent gear.

Next, reference is made in the following to a rotation controlling means 19 provided on a second hinge shaft 12 of a biaxial hinge 4. The rotation controlling means 19 consists of a synchronous rotation generator 15, a friction torque generator 20 and a rotational force generator 26. In the meantime, the friction torque generator 20 and the rotational force generator 26 share an elastic member 29 used for both. First, reference is made to a synchronous rotation generator 15. Particularly as shown in FIGS. 3 to 5, the synchronous rotation generator 15 comprises a first gear 16 consisting of bevel gear, wherein a deformed shaft portion 11d of the first hinge shaft 11 is inserted into a deformed insertion hole 16a provided on a central portion of the first gear in an axial direction, in order to engage the deformed insertion hole; a second gear 17 also consisting of bevel gear, wherein a deformed shaft portion 12b of the second hinge shaft 12 is inserted into a deformed insertion hole 17a provided on a central portion of the second gear in an axial direction, in order to engage the deformed insertion hole; and an intermediate gear 18 comprising a small diameter upper bevel tooth portion 18c and a large diameter lower bevel tooth portion 18d, wherein the intermediate gear is provided between the first gear 16 and the second gear 17 for transmitting the rotation of one of the first and second gears to the other, thereby allowing one gear to rotate in a direction different from the other. The intermediate gear 18 is assembled with an upper support shaft 18a provided coaxially with a first shaft supporting groove 14f (see FIG. 8C) being inserted into the latter, so that the upper support shaft is rotatably supported by the latter, and a lower support shaft 18b provided coaxially with a second shaft supporting groove 14g being inserted into the latter, so that the lower support shaft is rotatably supported by the latter; the first shaft supporting groove is provided on a lower circumferential wall of a first bearing hole 14c of the attaching member 14, and the second shaft supporting groove—on an upper circumferential wall of a second bearing hole of the attaching member. Due to the use of a first gear, a second gear and an intermediate gear as above described, a rotation of the first hinge shaft 11 for example in clockwise direction (opening direction) leads to a synchronized rotation of the second hinge shaft 12 in counter-clockwise direction. In this manner, a synchronous rotation generator 15 is structured, as shown with rotating arrows in FIG. 5. In the meantime, instead of the above-mentioned 3 gears, a first gear and a second gear only can be used, wherein the former is attached to the first hinge shaft 11, with the rotation of the first gear being restrained, and the latter with an outer diameter larger than the former is attached to the second hinge shaft 12, with the rotation of the second gear being restrained, thereby rotating in a direction different from the first gear.

Next, reference is made to an elastic member 29 provided on a tip of a second hinge shaft 12 of a biaxial hinge 4. The elastic member 21 comprises a plurality of elastic members 29a, 29a consisting of a plurality of disc springs, spring washers or the like, wherein a second deformed shaft portion 12f of a second hinge shaft 12 passes through their respective circular insertion holes 29b, and then the disc springs or the like overlap each other; a second backing washer 30 provided next to the elastic members 29a, 29a, wherein the deformed shaft portion 12b of a second hinge shaft 12 passes through a deformed insertion hole 23a of the first backing washer to engage with the deformed insertion hole; and a second fastening nut 31 provided next to the second backing washer 30, wherein a male screw portion 12 of the second hinge shaft 12 is screwed into a female screw hole 31a of the first fastening nut. The elastic member 29 as described above applies a press contact force to a friction torque generator 20 and a rotational force generator 26, so that the former can exert a friction torque generating function while the latter a suction function, when a first hinge shaft 11 and a second hinge shaft 12 rotate respectively at an opening and closing operation of a first casing 2 and a second casing 3. In other words, the elastic member 29 is a component both of the friction torque generator 20 and the rotational force generator 26.

In the following, reference is made to a subordinate friction torque generator 20a and a main friction torque generator 20b. Particularly as shown in FIGS. 3 to 5, the main friction torque generator 20b and the rotational force generator 26 are provided toward the second hinge shaft 12, and the main friction torque generator 20b is provided next to the rotational force generator toward a synchronous rotation generator 15. The main friction torque generator 20b comprises a friction plate 21, wherein a first hinge shaft 11 is rotatably inserted into a first bearing hole 21a provided on a small diameter portion 21f of the friction plate, and a second hinge shaft 12 into a second bearing hole 21b provided on a large diameter portion 21b; a friction washer 23 mounted on the second hinge shaft 12 with a rotation thereof being restrained relative to the second hinge shaft, by receiving a deformed shaft portion 12b of the second hinge shaft 12 into a deformed insertion hole 23a, wherein the friction washer is disposed between a side portion of an attaching member 14 and the friction plate 21; and an elastic member 29. Next, a subordinate friction torque generator 20a comprises a first washer 22, wherein a deformed shaft portion 11d of a first hinge shaft 11 is inserted into a deformed insertion hole 22a, so that the former is mounted on the latter with its rotation being restrained, and the first washer is provided between a small diameter portion 14j of the attaching member 14 and one surface of a small diameter portion 21f of the friction plate 21; and a second washer 24, wherein a deformed shaft portion 11d of a first hinge shaft 11 is inserted into a deformed insertion hole 24a, so that the former is mounted on the latter with its rotation being restrained, and the second washer is provided between the other surface of a small diameter portion 21f of the friction plate 21 and a first fastening nut 25 screwed onto a male screw portion 11e of the first hinge shaft 11. In the meantime, respective waffle-knurl pattern portions 21d, 21d are provided on respective one side surfaces of a small diameter portion 21f and a large diameter portion 21g of the friction plate 21. Further waffle-knurl pattern portions 22b, 23b are also provided respectively on the first washer 22 and the friction washer 23, however, these waffle-knurl pattern portions are not mandatory.

In the meantime, the rotation of a first washer 22 around the rotation axis of a first hinge shaft is restrained relative to the first hinge shaft 11 and that of the friction washer 23 22 around the rotation axis of a second hinge shaft relative to the second hinge shaft 12, but both are slidable in an axial direction.

Next, reference is made to a rotational force generator 26 provided next to a main friction torque generating mechanism 20b, more specifically between the latter and an elastic member 29. The rotational force generator 26 comprises a cam plate member 27 comprising a bearing hole 27a into which a deformed shaft portion 12b of the second hinge shaft 12 is rotatably inserted, wherein a substantially arc-shaped cam concave portion 27c (see FIG. 10A-10C) is formed outside on one side portion of the cam plate member; a cam follower member 28 attached to the second hinge shaft 12, with the rotation of the cam follower member being restrained, and having a cam convex portion 28b on one surface thereof facing the surface with a cam convex portion 27c of the cam plate member 27; and an elastic member 29 bringing the cam plate member 27 and the cam follower member 28 into press contact with each other. In other words, the elastic member 29 used for a main friction torque generating mechanism 20b is also used here. An arresting projecting piece 27b is provided on a cam plate member 27, and the second hinge shaft 12 is inserted through a bearing hole 27a of the arresting projecting piece, with the arresting projecting piece itself being inserted into a locking hole 21e of a friction plate 21, so that the second hinge shaft 12 is held so as to rotate relative to the friction plate 21 and the cam plate member 27. Inclined portions 27e, 27f are provided between a cam concave portion 27c and a flat portion 27d of the cam plate member 27. On the other hand, the rotation of a cam follower member 28 is restrained relative to the second hinge shaft 12 due to insertion of a deformed shaft portion 12b of the second hinge shaft 12 into a deformed insertion hole 28a. Inclined portions 28d, 28d are provided between a cam convex portion 28b and a flat portion 28c of the cam follower member 28. Due to the above-mentioned arrangement, when the second hinge shaft 12 rotates relative to the cam plate member 27, the cam follower member 28 also rotates relative to the cam plate member 27 together with the second hinge shaft 12. Accordingly, the cam convex portion 28b of the cam follower member 28 sometimes fits into the cam concave portion 27c of the cam plate member 27 and sometimes not, depending on the rotation angular position of the cam follower member. In the meantime, the rotation of the cam follower member 28 is restricted relative to the second hinge shaft 12, but it is slidable in an axial direction.

In the meantime, a cam concave portion 27c can be also formed as a cam concave portion instead, a friction torque generator 20 and a rotational force generator 26 are not limited in their installation positions, and not to those in embodiment.

In the following, reference is made to the operation of the biaxial hinge 4. In the biaxial hinge 4 according to the invention having the above-mentioned structure, when the second casing 3 of the notebook PC etc. is opened and closed relative to the first casing 2, the first hinge shaft 11 and the second hinge shaft 12, held by the attaching member 14 so as to be rotatable in parallel to each other, can rotate in a synchronized manner by the synchronous rotation generator 15, one in a direction different from the other. Here, since the first washer 22 and the second washer 24 mounted on the first hinge shaft 11, with their rotation being restrained, rotates together with the first hinge shaft 11, the subordinate friction torque generator 20a generates a small friction torque between both surfaces of the small diameter portion 21f of the friction plate 21 and the small diameter portion 14j of the attaching member 14. On the other hand, since the friction washer 23 mounted on the second hinge shaft 12, with its rotation being restrained, rotates together with the second hinge shaft 12, the main friction torque generator 20b generates a main or large friction torque between the large diameter portion 21g of the friction plate 21 and the large diameter portion 14k of the attaching member 14. In this manner, the second casing 3 can stably stop at any opening and closing angle relative to the first casing 2. Furthermore, without a rotational force generator 26 and an elastic member 29 on the first hinge shaft 11, the overall structure can be simplified and the manufacturing cost can be reduced.

Figure 12A:
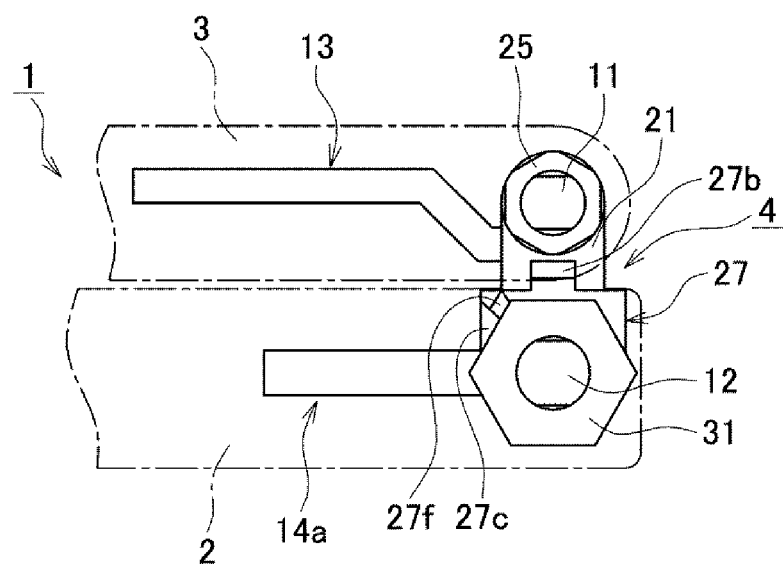
FIGS. 12A and 12B are explanatory views illustrating an operation of a biaxial hinge according to the invention, FIG. 12A being a side view showing a closed state of a first casing and a second casing, FIG. 12B—an explanatory view showing a contact state of a cam plate member and a cam follower member in this state.
Figure 12B:
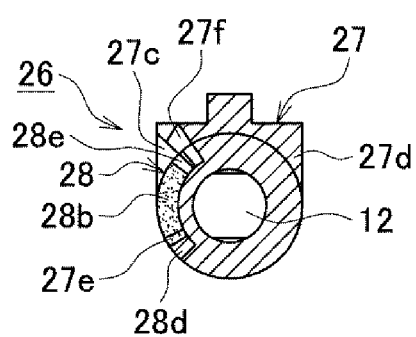

The friction torque and suction functions during the opening and closing operations are further explained based on FIGS. 12A to 15B. FIG. 12A shows the closed state of the first casing 2 and the second casing 3 (both are shown in imaginary lines in FIGS. 12A to 15B) of the notebook PC 1 being an example of terminal device, while FIG. 12B—a contact state of the cam plate member 27 and cam follower member 28 of the rotational force generator 26 at this time. In FIG. 12B, as per the cam plate member 27, the flat portion 27d raised from its cam concave portion 27c is shown in slanted lines, while as per the cam follower member 28, the cam convex portion 28b raised from its the flat portion 28c is shown in fine dot pattern. At an opening angle of 0 degree as above described, the inclined portions 28d, 28e of the cam follower member 28 partially overlap the inclined portions 27e, 27f of the cam plate member 27, so that the pressurizing force of the elastic member 29 produces the force in the direction causing the cam convex portion 28b of the cam follower member 28 to fall into the cam concave portion 27c of the cam plate member 27, or the force in the direction rotating the cam follower member 28 (as well as the second hinge shaft 12) clockwise in FIG. 12B (that is the rotational force by the rotational force generator 26). In addition to these forces, the force in the direction rotating the first hinge shaft 11 (as well as the second hinge shaft 12) counterclockwise is also generated by the synchronous rotation generator 15. Still further, the suction function can thus maintain the closed state of the first casing 2 and the second casing 3 without allowing the first casing 2 and the second casing 3 to automatically open relative to each other, even if no latching means is provided.

Figure 13A:
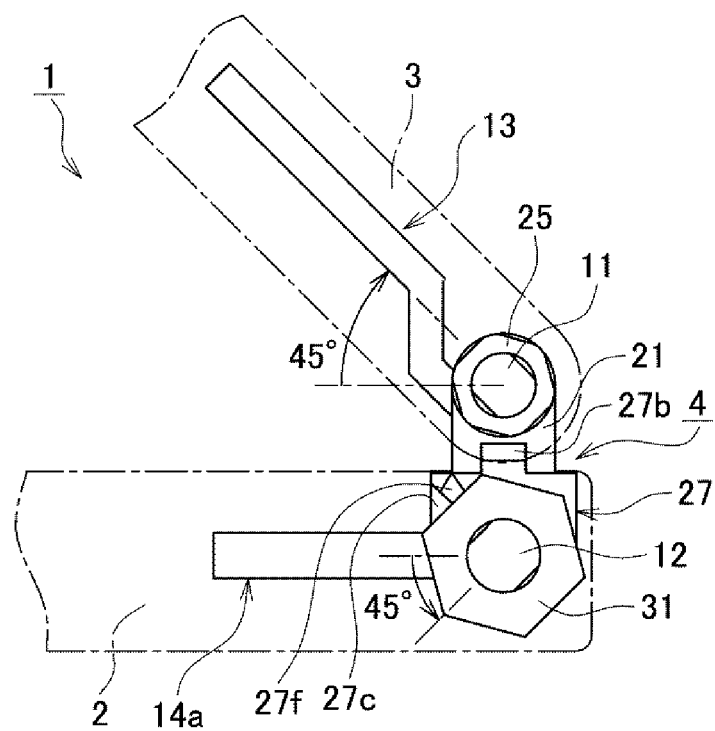
FIGS. 13A and 13B are explanatory views illustrating an operation of a biaxial hinge according to the invention, FIG. 13A being a side view showing a state of a first casing and a second casing opened at 45 degrees, FIG. 13B—an explanatory view showing a contact state of a cam plate member and a cam follower member in this state.
Figure 13B:
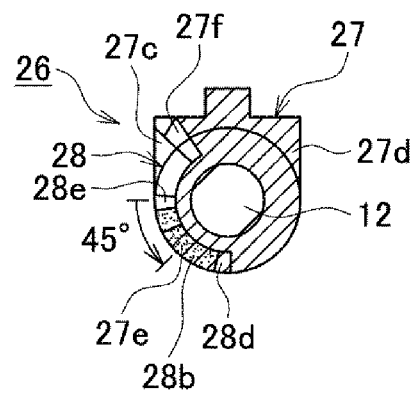

Next, as shown in FIG. 13A, when the second casing 3 is opened clockwise for example to 45 degrees with holding the first casing 2, due to the action of the synchronous rotation generator 15, first, the first hinge shaft 11 rotates 45 degrees clockwise, and the intermediate gear 18 rotates 45 degrees counterclockwise via the upper bevel tooth portion 18c of the intermediate gear 18 meshed with the first bevel tooth portion 16b of the first gear 16 rotating together with first hinge shaft 11, and the second gear 17 attached to the second hinge shaft 12, which allows the second bevel tooth portion 17b of the second gear 17 to mesh with the lower bevel tooth portion 18d of the intermediate gear 18, rotates counterclockwise as well. In this manner, the second hinge shaft 12 rotates 45 degrees in a direction opposite to the rotation direction of the first hinge shaft 11. In addition to that, the cam follower member 28 rotating together with the second hinge shaft 12 also rotates 45 degrees counterclockwise, thus more than half of the cam concave portion 28b of the cam follower member 28 is over the flat portion 27d of the cam plate member 27. Therefore, the elastic members 29a, 29a of the elastic member 29 are more compressed than in FIG. 12A, and thus their elastic force increases, so that the friction torque by the friction torque generator 20 increases, in order to thus secure a stable stop (tilt) at any angular position of the second casing 3 during its opening and closing operation.

Figure 14A:
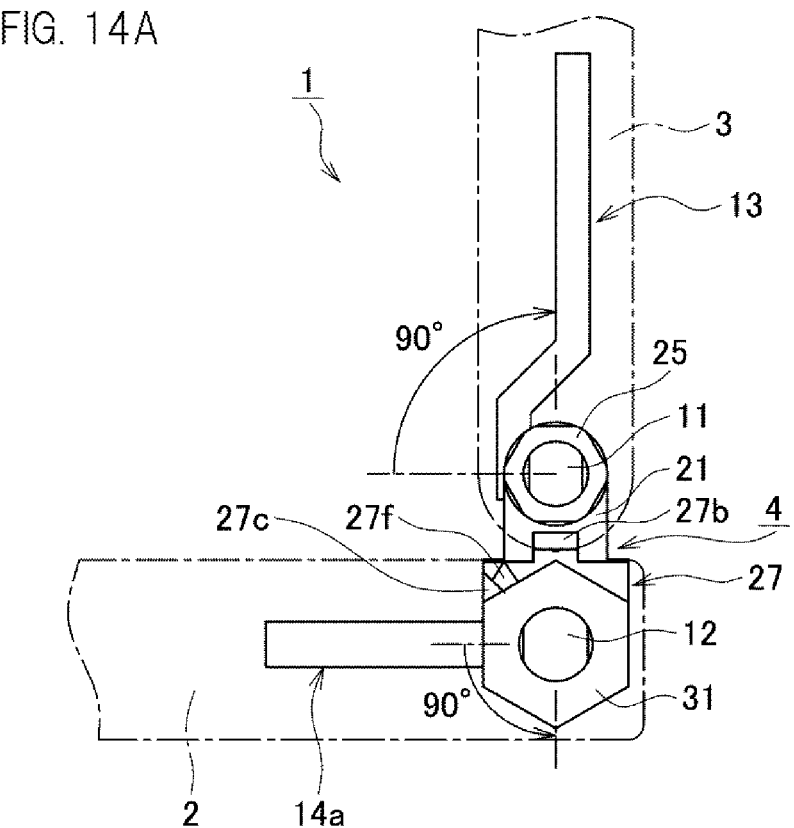
FIGS. 14A and 14B are explanatory views illustrating an operation of a biaxial hinge according to the invention, FIG. 14A being a side view showing a state of a first casing and a second casing opened at 90 degrees, FIG. 14B—an explanatory view showing a contact state of a cam plate member and a cam follower member in this state.
Figure 14B:
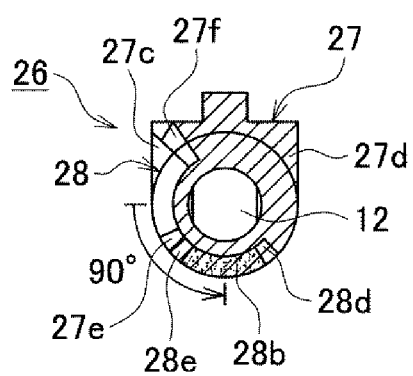
Figure 15A:
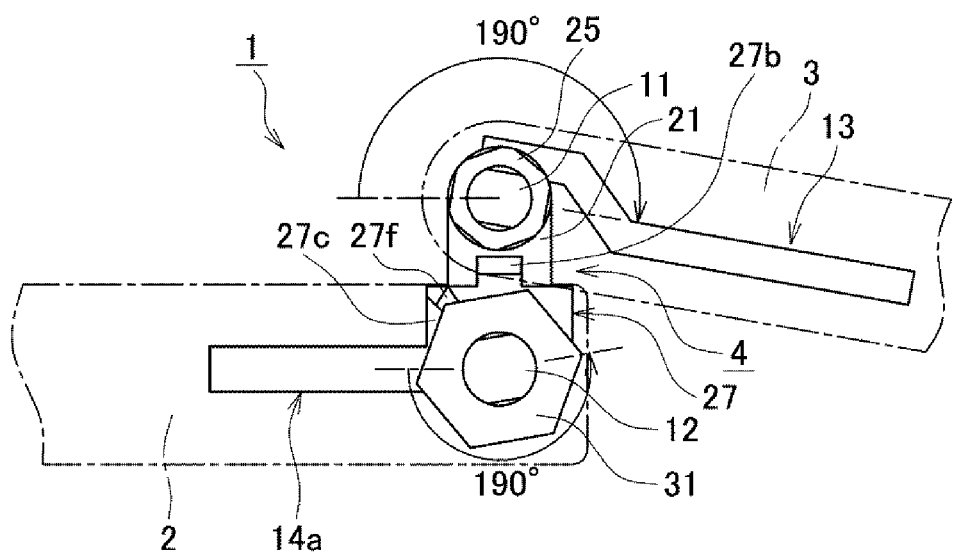
FIGS. 15A and 15B are explanatory views illustrating an operation of a biaxial hinge according to the invention, FIG. 15A being a side view showing a state of a first casing and a second casing opened at 190 degrees, FIG. 15B—an explanatory view showing a contact state of a cam plate member and a cam follower member in this state.
Figure 15B:
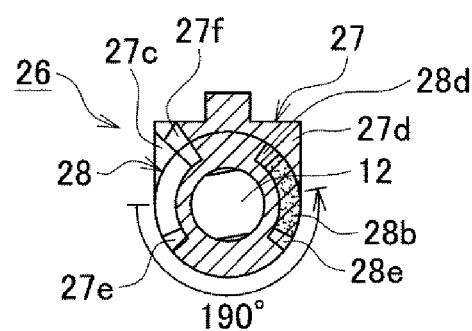

In the following, FIG. 14A equally shows the state of the second casing 3 opened at 90°, while FIG. 15A—that of the same casing opened at 190 degrees being the limit angle according to the invention. In the above-mentioned angles, the state in which the cam concave portion 28b of the cam follower member 28 is over the flat portion 27d of the cam plate member 27, and the stable stop function of the second casing 3 at any angular position Still further, since the first hinge shaft 11 and the second hinge shaft 12 are attached to respective bearing holes 14b of the attaching member 14, as arranged in an upward and downward direction, even at the limit angle as shown in FIG. 15A, the second casing 3 does not interfere with various plugs and cables connected with various ports such as LAN port 6b and USB ports 6c, 6d (see FIG. 1B), etc. provided on the rear side surface of the first casing 2, nor hinders their use. Moreover, in case that heat vents are provided on the rear side surface of the first casing 2, the second casing does not even cover them. In the meantime, in order to prevent the first casing 2 and the second casing 3 from damaging and so on due to an excessive opening of the second casing 3, a stopper for stopping the second casing 3 at a predetermined opening position can be also provided for example between the first hinge shaft 11 and the attaching member 14.

When the second casing 3 is closed, the first hinge shaft 11 and the second hinge shaft 12 rotate in a direction opposite to as described above, and when the cam convex portion 28b of the cam follower member 28 approaches to an angular position in which it automatically approaches to the cam convex portion 27c of the cam plate member 27 under suction function, which brings the second casing 3 into rotational urging in a direction automatically closing the casing.

In the meantime, other possible embodiments include, though not shown in the drawings, the use of spur gears for the first gear 16 and the second gear 17, whereby these gears are so designed that they directly mesh with each other, without intervention of an intermediate gear. Still further, the elastic members 29a, 29a used for the elastic member 29 can be replaced with compression coil springs or the ones made of elastic materials, i.e. synthetic resin such as rubber. Moreover, when the biaxial hinges 4 and 5 are attached to the notebook PC 1, the synchronous rotation generator 15, the friction torque generator 20, the rotational force generator 26, and the elastic member 29 are exposed to the outside which might spoil the appearance. Thus, to prevent such a situation, it is also recommended to provide the hinge case which can cover all these.

The present invention is constructed as described above, so that it is suitable used as a biaxial hinge which can secure a required friction torque by providing the main friction torque generator and the rotational force generator on the second hinge shaft, as well as a thinner second casing on the first hinge shaft side. Still further, the biaxial hinge is well adjustable in that it prevents various plugs and cables connected with various ports provided on the rear side surface from confronted by the rear side surface of the second casing, as well as heat vents from being covered, thus avoiding any hindrance to their functions.

What is claimed is:

1. A biaxial hinge (4, 5) of a terminal device (1) which couples a first casing (2) and a second casing (3), the casings being openable and closable relative to each other, said biaxial hinge comprising:
   an attaching member (14) comprising an attaching plate portion (14a) attached to said first casing (2) and a bearing portion (14b) provided with a large diameter portion (14k) and a small diameter portion (14j) erected upward from said attaching plate portion (14a);
   a first hinge shaft (11) with a smaller outer diameter which is pivotally supported at the small diameter portion (14j) of said attaching member (14) so as to be rotatable, and attached via an attaching plate (13) to said second casing (3);
   a second hinge shaft (12) with an outer diameter larger than said first hinge shaft (11) which is pivotally supported at the large diameter portion (14k) of said attaching member (14) in parallel to said first hinge shaft (11) and with a shift in an axial direction;
   a synchronous rotation generator (15) provided between said first hinge shaft (11) and said second hinge shaft (12), said synchronous rotation generator (15) comprising:
      a first gear (16) attached to said first hinge shaft, with the rotation of said first gear being restrained to said first shaft;
      a second gear (17) with an outer diameter larger than said first gear, attached to said second hinge shaft, with the rotation of said second gear being restrained to said second hinge shaft; and
      an intermediate gear (18) provided between said first gear and said second gear for transmitting rotation between said first gear and said second gear,
      said intermediate gear having a small diameter upper tooth portion configured to engage said first gear and a large diameter lower tooth portion configured to engage said second gear; said intermediate gear has a rotation axis perpendicular to said first hinge shaft and said second hinge shaft, thereby allowing said first gear and said second gear to rotate in a direction different from one other;
   a subordinate friction torque generator (20a) for generating a friction torque in rotation of said first hinge shaft is provided toward said first hinge shaft (11), and
   a main friction torque generator (20b) for generating a friction torque larger than said subordinate friction torque generator in rotation of said second hinge shaft and a rotational force generator (26) are provided toward said second hinge shaft (12).

2. The biaxial hinge according to claim 1, said main friction torque generator (20) comprising: a friction plate (21), said first hinge shaft and said second hinge shaft being rotatably inserted thereto; a friction washer (23) provided between said large-diameter portion of said bearing portion of said attaching member (14) and said large-diameter portion of said friction plate (21); and an elastic member (29) provided on said second hinge shaft (12) for bringing said attaching member (14) and said friction washer (23) into press contact with said friction washer (23).

3. The biaxial hinge according to claim 1, said subordinate friction torque generator (20a) comprising: a friction plate (21), said first hinge shaft and said second hinge shaft being rotatably inserted thereto; a first washer (22) arranged between one side of a small diameter portion of said friction plate and a small diameter portion of said attaching member, with the rotation of said first washer being restrained; a second washer (22) disposed between the other side of a small diameter portion of said friction plate and a first fastening nut (25) screwed onto said first hinge shaft, with the rotation of said first hinge shaft being restrained.

4. The biaxial hinge according to claim 1, said rotational force generator (26) comprising: a cam plate member (27) arrested on said friction plate, said second hinge shaft being rotatably inserted therein, and comprising a cam concave portion and a cam convex portion, both in substantially arc shape, outside on one side thereof; a cam follower member (28) attached to said second hinge shaft, with the rotation of said cam follower member being restrained, and having cam concave portion and cam convex portion on one side thereof facing said cam concave portion and said cam convex portion of said cam plate member; and an elastic member (29) bringing said cam plate member and said cam follower member, both provided on said second hinge shaft into press contact with each other.

5. A terminal device (1) using the biaxial hinge according to claim 1.

* * * * *